(12) United States Patent
Daraio et al.

(10) Patent No.: US 9,348,949 B2
(45) Date of Patent: May 24, 2016

(54) SOUND PROOF HELMET

(71) Applicant: CALIFORNIA INSTITUTE OF TECHNOLOGY, Pasadena, CA (US)

(72) Inventors: Chiara Daraio, Pasadena, CA (US); Georgios Gkantzounis, Kamena Vourla (GR)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 327 days.

(21) Appl. No.: 14/103,708

(22) Filed: Dec. 11, 2013

(65) Prior Publication Data

US 2014/0245522 A1    Sep. 4, 2014

Related U.S. Application Data

(60) Provisional application No. 61/738,960, filed on Dec. 18, 2012.

(51) Int. Cl.
*A61B 7/02* (2006.01)
*G06F 17/50* (2006.01)
*A42C 2/00* (2006.01)
*A42B 3/06* (2006.01)
*A42B 3/16* (2006.01)

(52) U.S. Cl.
CPC .............. *G06F 17/50* (2013.01); *A42B 3/063* (2013.01); *A42B 3/166* (2013.01); *A42C 2/00* (2013.01); *G06F 2217/82* (2013.01); *Y02T 10/82* (2013.01)

(58) Field of Classification Search
CPC ........................................................ A61B 7/02
USPC ........................................................ 181/126
See application file for complete search history.

(56) References Cited

U.S. PATENT DOCUMENTS

| | | | | |
|---|---|---|---|---|
| 6,070,271 | A * | 6/2000 | Williams | 2/412 |
| 8,534,417 | B2 * | 9/2013 | Lam et al. | 181/207 |
| 8,607,921 | B2 * | 12/2013 | Berker et al. | 181/129 |
| 2004/0261157 | A1 * | 12/2004 | Talluri | 2/412 |
| 2005/0117771 | A1 * | 6/2005 | Vosburgh et al. | 381/376 |
| 2008/0191950 | A1 * | 8/2008 | Chang et al. | 343/718 |
| 2008/0302599 | A1 * | 12/2008 | Zou | 181/290 |
| 2012/0102629 | A1 * | 5/2012 | Lott et al. | 2/410 |
| 2012/0186002 | A1 * | 7/2012 | Bhatnagar et al. | 2/412 |
| 2012/0204327 | A1 * | 8/2012 | Faden et al. | 2/411 |
| 2012/0297526 | A1 * | 11/2012 | Leon | 2/413 |
| 2013/0061371 | A1 * | 3/2013 | Phipps et al. | 2/411 |
| 2013/0152287 | A1 * | 6/2013 | Cormier et al. | 2/459 |

OTHER PUBLICATIONS

Sainidou et al., Locally resonant phononic crystals made of hollow spheres or cylinders, Phys. Rev. B 73, 024302 (2006).
H. Chen and C. T. Chan, *Acoustic cloaking in three dimensions using acoustic metamaterials*, Appl. Phys. Lett. 91, 183518 (2007).

(Continued)

*Primary Examiner* — Forrest M Phillips
(74) *Attorney, Agent, or Firm* — Steinfl & Bruno LLP

(57) ABSTRACT

Novel methods and systems for acoustic proofing are disclosed. A sound proof helmet can be designed by optimizing several layers of different materials, thickness, and physical properties. The thickness of the layers can be smaller than the wavelength of the sound waves which are meant to be reduced.

13 Claims, 4 Drawing Sheets

(56) References Cited

OTHER PUBLICATIONS

Y. Cheng, F. Yang, J. Y. Xu, and X. J. Liu, *A multilayer structured acoustic cloak with homogeneous isotropic materials*, Appl. Phys. Lett. 92, 151913 (2008).

Y. Cheng and X. J. Liu, *Three dimensional multilayered acoustic cloak with homogeneous isotropic materials*, Appl. Phys. A 94, 25-30 (2009).

S. Zhang, C. Xia, and N. Fang, *Broadband Acoustic Cloak for Ultrasound Waves*, Phys. Rev. Lett. 106, 024301 (2011).

* cited by examiner

SOUND PROOF HELMET

CROSS REFERENCE TO RELATED APPLICATIONS

The present application claims priority to U.S. Provisional Patent Application No. 61/738,960, filed on Dec. 18, 2012, the disclosure of which is incorporated herein by reference in its entirety.

STATEMENT OF INTEREST

This invention was made with government support under N00014-12-17-0962 awarded by the Office of Naval Research. The government has certain rights in the invention.

TECHNICAL FIELD

The present disclosure relates to acoustics shielding. More particularly, it relates to a sound proof helmet.

BRIEF DESCRIPTION OF DRAWINGS

The accompanying drawings, which are incorporated into and constitute a part of this specification, illustrate one or more embodiments of the present disclosure and, together with the description of example embodiments, serve to explain the principles and implementations of the disclosure.

SUMMARY

In a first aspect of the disclosure, a sound proof helmet is described, the sound proof helmet comprising: a plurality of layers arranged in a concentric hemispherical sequence, each layer of the plurality of layers having a thickness smaller than a wavelength in a desired acoustic frequency range, the plurality of layers arranged in a sequence configured to optimize acoustic proofing, the plurality of layers comprising at least one first material with a low bulk modulus; and at least one second material with a high bulk modulus.

DETAILED DESCRIPTION

The design of a sound proof helmet can be carried out in different ways. For example, the helmet may be considered as a number of concentric (hemi) spherical shells. The inner air cavity can then account for the inner cavity of the helmet where a user's head fits. The sound incident from the outside of the helmet to the surface and the inside of the helmet can often be modeled as a plane acoustic wave, since in most cases the source of the sound is located in a relatively distant position. In this case, 'relatively' often means that the distance between the source and the helmet is greater than a characteristic length of the helmet, for example the diameter for the case of a spherical shell. Sound proofing the helmet can mean achieving low field patterns in the inner cavity. This problem is similar to acoustic cloaking and techniques used to investigate this problem can be applied to the current problem, as well.

Acoustic cloaking is described, for example in: Chen et al., *Acoustic cloaking in three dimensions using acoustic metamaterials*, Appl. Phys. Lett. 91, 183518 (2007); Cheng et al., *A multilayer structured acoustic cloak with homogeneous isotropic materials*, Appl. Phys. Lett. 92, 151913 (2008); Cheng et al., *Three dimensional multilayered acoustic cloak with homogeneous isotropic materials*, Appl. Phys. A 94, 25-30 (2009); and Zhang et al., *Broadband Acoustic Cloak for Ultrasound Waves*, Phys. Rev. Lett. 106, 024301 (2011), the disclosure of all of which is incorporated herein by reference in their entirety.

A possible difference between acoustic cloaking and sound proofing may be that, while in the case of cloaking there is interest in not disturbing the wave propagating in the surrounding medium, in the case of sound proofing there is interest in attenuating the sound at the inner boundary of the cloak. Acoustic cloaking in two and three dimensions can be efficiently achieved by using homogeneous isotropic cylindrical or spherical shells, for example.

Figure 1:
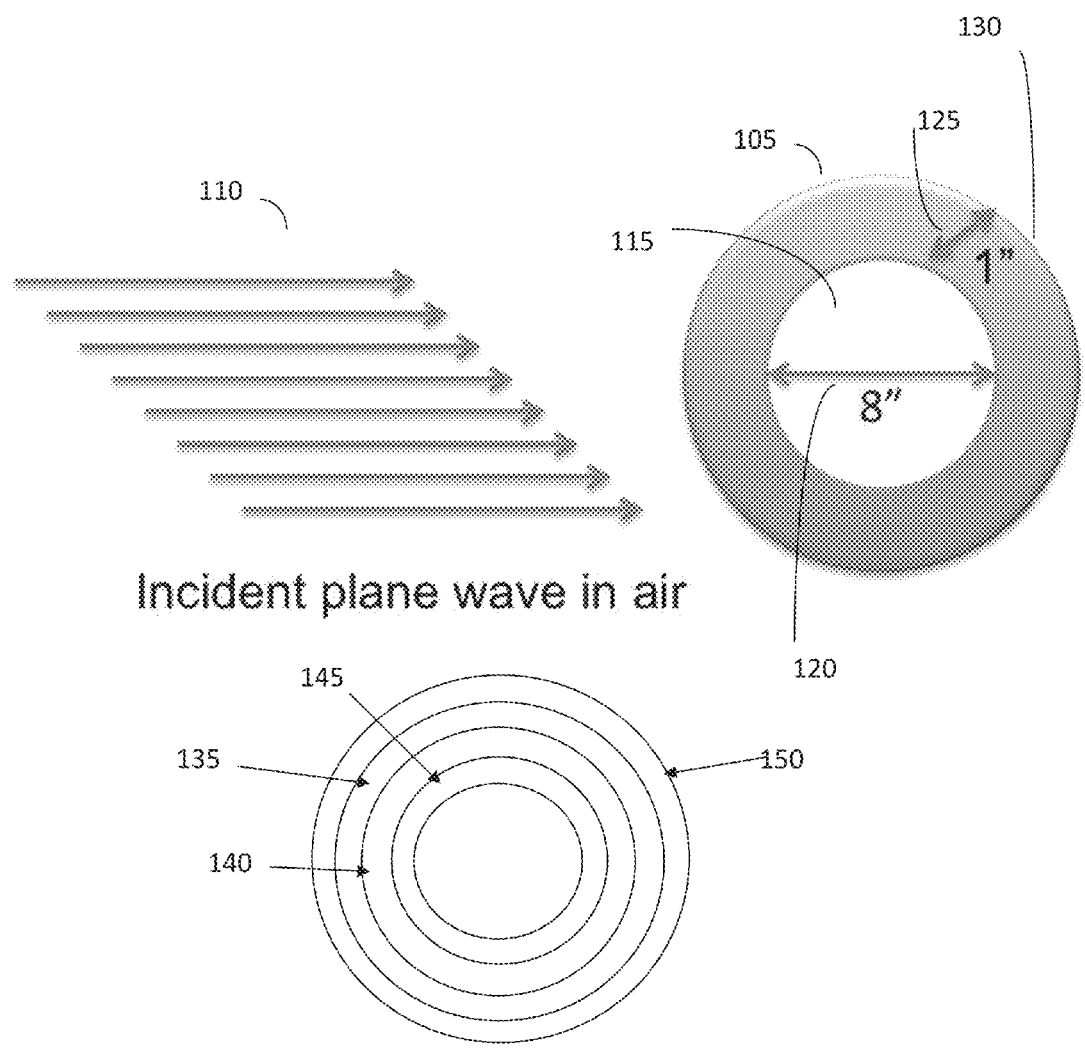
FIG. 1 illustrates an exemplary embodiment of a spherical model for a helmet.

In the present disclosure, a helmet can be modeled as a spherical coating covering an inner spherical (air) cavity, as shown in FIG. 1, for example.

In FIG. 1, a spherical model for a helmet (105) is shown. A plane wave (110) is incident on the helmet (105). The helmet (105) has an inner cavity (115). The plane wave (110) may travel in air, water, or other fluids. As an example, and not meant as a limitation, the helmet (105) has an inner diameter (120) of 8" and a thickness (1250 of 1". The coating or shell (130) can be made of a number of homogeneous isotropic spherical shells of variable thickness and different materials. For example, a shell with multiple layers may comprise a layer with high density (150), a layer of low density (135), a layer with high density (140) and an inner layer with low density (145). A typical choice of materials can extend from soft rubber to hard stainless steel, as shown in Table 1.

TABLE 1

| Material | Density (Kg/m$^3$) | Compressional wave velocity (m/s) |
|---|---|---|
| Rubber | 1000 | 1500 |
| Polymer | 1174 | 3144 |
| Aluminum | 2700 | 6153 |
| Stainless Steel | 7950 | 5717 |

By modeling the helmet it is possible to optimize the composition of the shell (130) by optimizing, for example, the material parameters and the thickness of the various shells to achieve an optimum effect with regard to sound proofing. It may also be possible to optimize the design while taking into consideration non-acoustic objectives or requirements, for example mechanical strength and crash or pressure resistance.

A fast and rigorous method that can be used to approach the problem of modeling a helmet is the T-matrix method. The method is described, for example, in Cheng et al. (2009) as referenced above, as well as Sainidou et al., *Locally resonant phononic crystals made of hollow spheres or cylinders*, Phys. Rev. B 73, 024302 (2006), the disclosure of which is incorporated herein by reference in its entirety.

The T-matrix method is a semi-analytical method that takes into account continuity of the elastic field and of the stress tensor at the interfaces between the various shells that compose shell (130) of FIG. 1. The T-matrix method has been proven very efficient in calculating the field of a coated spherical object. The high speed of this method makes it an ideal candidate for optimization purposes. Optimization algorithms can demand evaluation of many different configurations and therefore the use of finite element approaches would likely not be efficient. In the present disclosure the T-matrix approach can be combined with genetic algorithm optimization techniques to derive optimized helmet structures. In other embodiments, the simulation may be carried out on a hemispherical shell.

A first step in the optimization and design method may be identifying the optimization region. As a first approximation it may be possible to consider only compressional waves throughout the helmet structure. A typical acoustic field plot for a plane wave incident on a rubber coating from below the coating (negative z-axis) is shown in FIG. 2.

Figure 2:
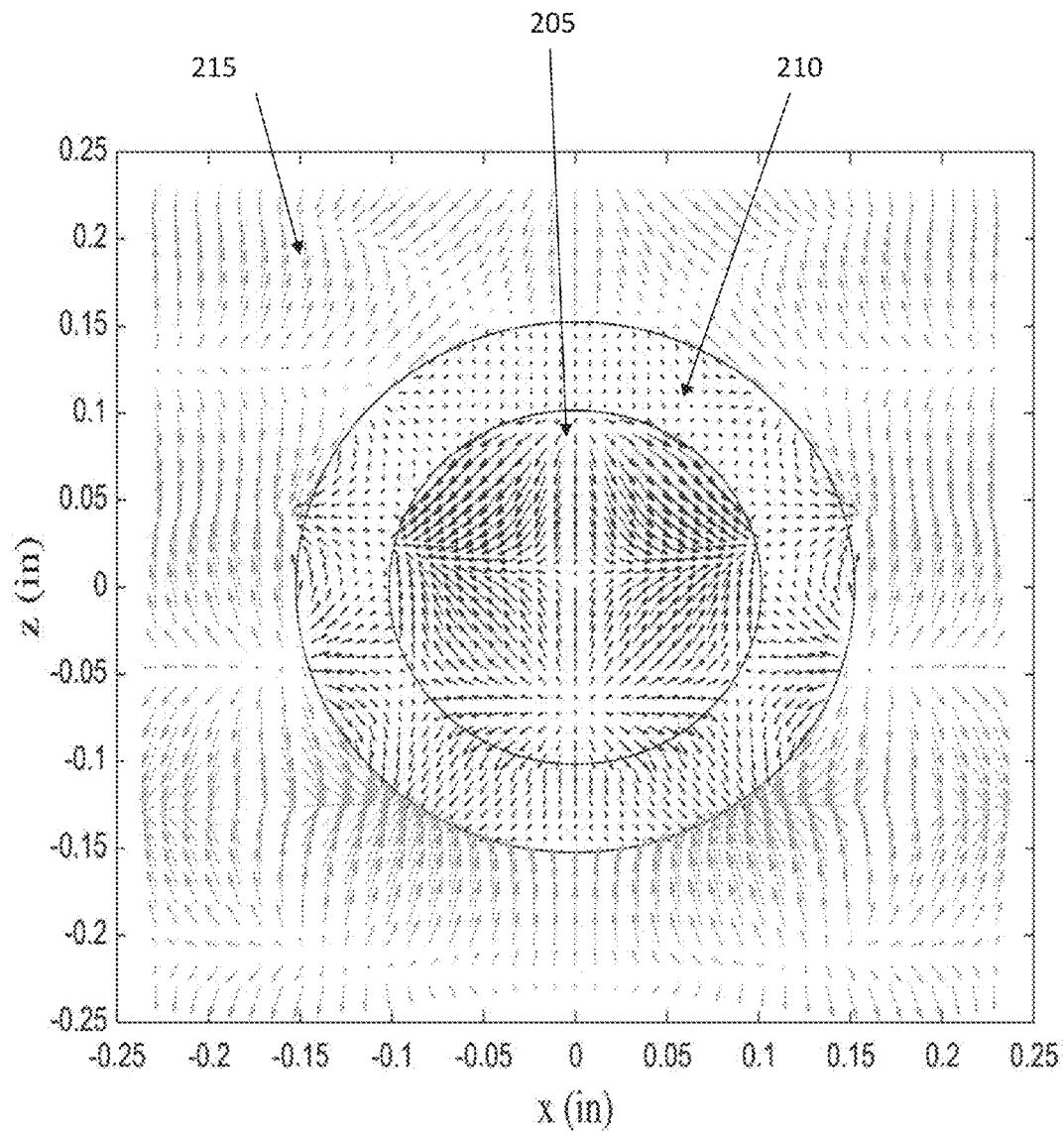
FIG. 2 illustrates an example of an acoustic field plot for a plane wave incident on a rubber coating.

The acoustic field in FIG. 2 is strongly attenuated inside the inner cavity (205) and the shell (210), compared to the region outside (215). For clarity, the vectors inside the inner cavity (205) and shell (210) are magnified compared to the vectors outside (215) the shell (210) to increase their visibility in the plot of FIG. 2. In the example of FIG. 2, the local field at 2 kHz of the acoustic wave is plotted for incidence from below (negative z-axis). The air inner cavity (205) is shielded by a 1" thick rubber coating (210). The scale of the vectors (arrows) representing the field outside (215) the coating (210) is ×0.025, while the scale of the vectors in the inner cavity (205) and shell (210) is ×7.

Figure 3:
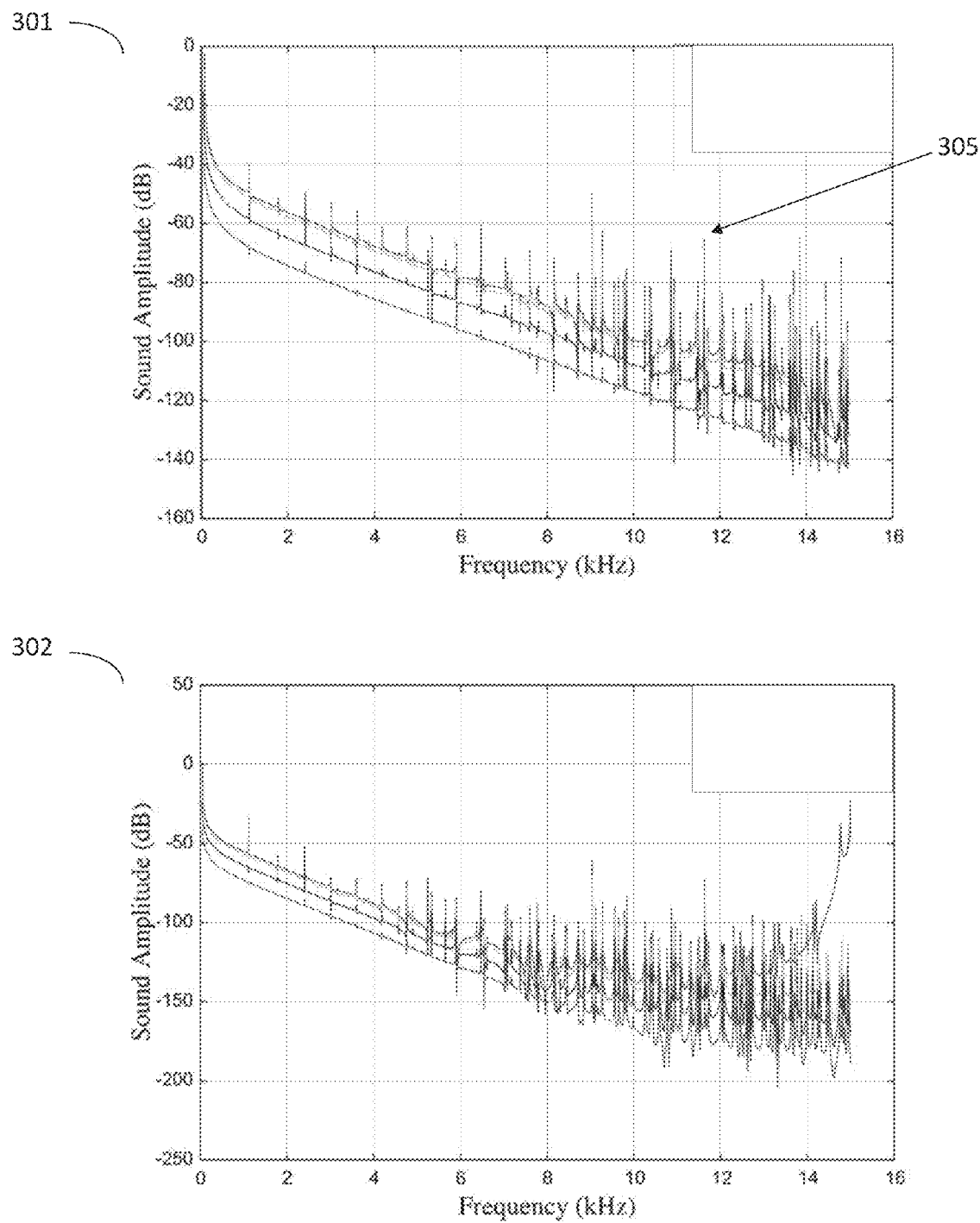
FIG. 3 illustrates exemplary plots for sound waves at different frequencies.

In FIG. 3 two plots (301, 302) are shown. One plot (301) illustrates the sound amplitude at a given point of the interface between a shell and an inner air cavity, for a thickness of 1". A second plot (302) illustrates the sound amplitude at a given point of the interface between a shell and an inner air cavity, for a thickness of 2".

In this example, the sound amplitude is normalized to the amplitude of the incident wave. The different curves in each plot (301, 302) correspond to shells being made by one of the different four materials of Table 1.

It can be noted in FIG. 3 that the attenuation is stronger the higher the impedance of the material. As known to the person skilled in the art, the acoustic impedance equals the density times the sound velocity. Moreover, with the exception of the rubber material, the attenuation is stronger the thicker the coating. As understood by the person skilled in the art, the various spikes (305) in the curves of plots (301, 302) correspond to eigenmodes of the specific helmet structure.

A next possible step in the optimization technique is to take into consideration the shear waves that will be formed in the shells.

The helmets of the present disclosure can be fabricated assembling different individual layers in a sequence (manually or mechanically) or 3-D printing them directly with polymers or metal rapid prototyping solutions. The hard layers could be fabricated using pre-formed metal sheets, or using molds, while the soft layers could be fabricated using soft polymeric materials, low-density foams or even thin air cushions/airbags. The layers can be simply positioned adjacent to each other, glued or sintered together.

The present disclosure describes a way to design sound proof helmets. Instead of using conventional foams to damp sound (as standard sound proof materials are), the present disclosure describes a different approach: using en ensemble (or an array) of thin (sub-wavelength) layers of soft and hard materials, alternating in a specific sequence.

In some embodiments, the layers have a thickness that is smaller than the wavelength of the sound waves that the helmet is supposed to reduce in intensity.

In some embodiments, a basic sequence of layers would be starting from an external (hard) layer and then continuing alternating soft-hard-soft, etc.

To optimize the thickness and exact alternating sequence desired for a specific sound proofing application, different optimization approaches can be used, as known to the person skilled in the art. For example, T-matrix methods may be used. Differential evolution and simulated annealing could be used, as known to the person skilled in the art. Through these methods, it is possible to calculate precise performance metrics for each geometry and sequence selected.

The optimization may require a specific weight, or thickness, or degree of sound proofing. The type of sound to be dampened may be different for different applications. For example, some helmets may be meant to reduce freeway traffic sounds for motorcyclists. Other helmets may be meant to reduce construction work for workers in safety gear. Other helmets may be meant to be used on the battlefield by soldiers, or by divers underwater.

In some embodiments, it is possible to fabricate a sound proof helmet consisting of alternating layers of soft polymers (or air cushions) and thin metal interlayers (e.g., steel) in an optimized (not necessarily ordered) sequence. Therefore, in some embodiments the layers may be alternating different materials, but they need not be soft-hard-soft; the layers could be soft-soft-hard, where the two soft layers are made of different materials.

The sequence of the layers can be decided based on numerical optimization approaches. This provides dramatically improved acoustic absorption that is several orders of magnitude better than existing technologies.

In some embodiments, the acoustic frequencies optimized lay in the range 0.2-20 kHz. In some embodiments, five different frequencies are chosen within the range, and optimization is carried out at the five different frequencies. In such a way, it may be possible to optimize the sound proofing of a helmet over a broad range without having to optimize for every frequency within the desired range.

The material density of the materials used may be in the range 0.01-100 g/m$^3$. The material bulk modulus may be from 2 kPa to 2×10$^{15}$ Pa.

Table 2 lists an exemplary optimization for 2 layers.

TABLE 2

| Thickness (inches) | Density (g/m$^3$) | Bulk Modulus (GPa) |
| --- | --- | --- |
| 0.287 | 10 | 72 |
| 0.713 | 0.1 | 2.20 |

Table 3 lists an exemplary optimization for 4 layers.

TABLE 3

| Thickness (inches) | Density (g/m$^3$) | Bulk Modulus (GPa) |
| --- | --- | --- |
| 0.165 | 10 | 18.5 |
| 0.016 | 0.1 | 2.20 |
| 0.121 | 10 | 2.20 |
| 0.698 | 0.1 | 18.0 |

Table 4 lists exemplary values for single layers.

TABLE 4

| Material | Density (g/m$^3$) | Bulk Modulus (GPa) | Total Mass (kg) |
| --- | --- | --- | --- |
| Rubber | 1.0 | 2.25 | 419 |
| Aluminum | 2.7 | 102 | 11.31 |
| Steel | 7.95 | 260 | 33.29 |

Figure 4:
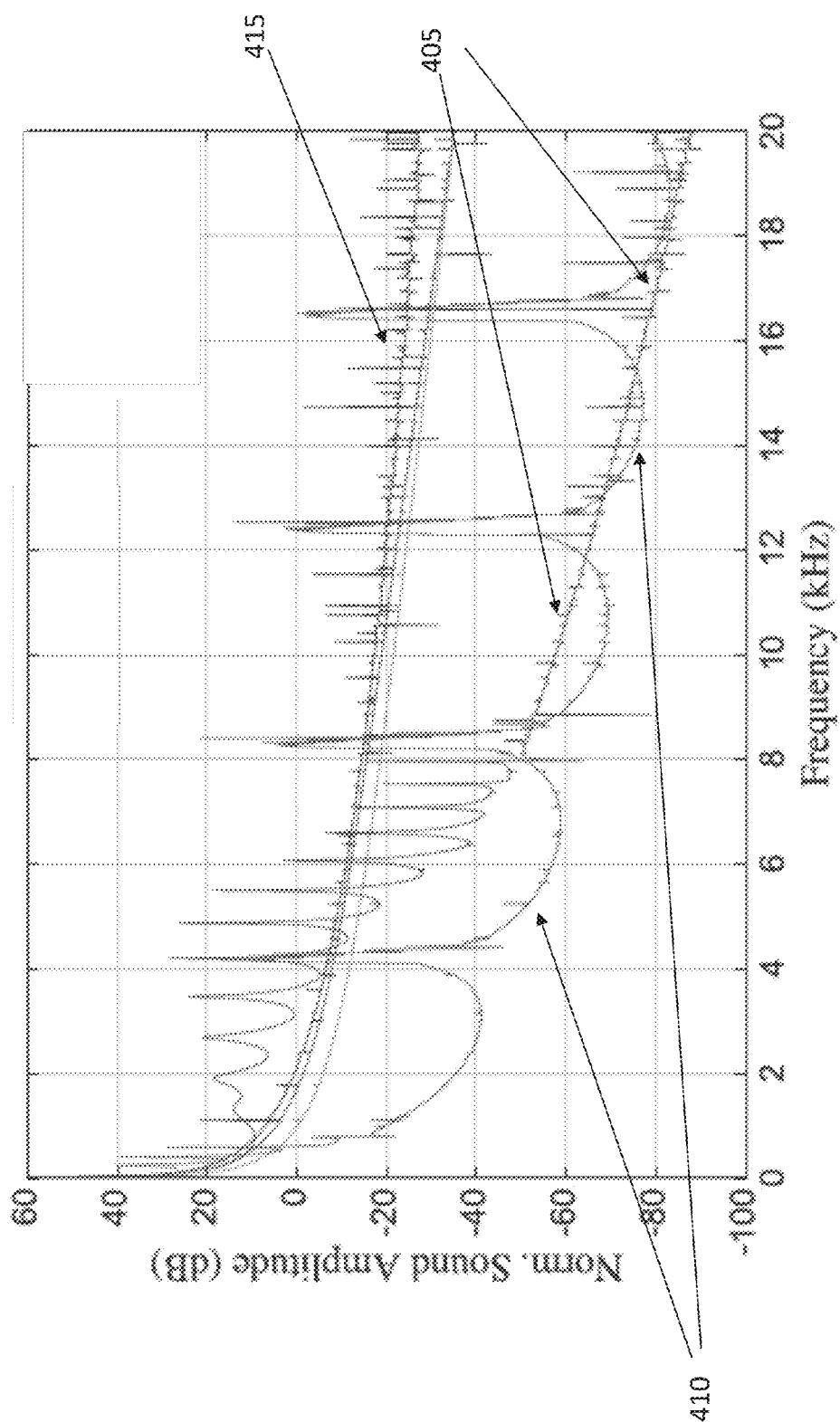
FIG. 4 illustrates an exemplary plot for multilayer and single layer structures.

FIG. 4 illustrates an exemplary result of a comparison of sound proofing for different materials. The 4-layer optimized structure (405) and the 2-layer optimized structure (410) have significantly better acoustic proofing than the remaining materials (415), rubber, aluminum and steel.

In other embodiments, different materials or number of alternative layers may be used. In some embodiments, optimized multilayer structures are more efficient at sound proofing than single-layer structures with high impedance mismatch.

In some embodiments, increasing the number of layers improves the acoustic proofing efficiency. The sound pressure inside the helmet can remain substantially undisturbed compared to the pressure outside the helmet.

In some embodiments, the helmet may comprise as layers air cushions or small airbags alternating with layers made of materials with a high density.

In some embodiments, a helmet shell may comprise multiple layers of different thicknesses, where some layers may have a thickness smaller than the acoustic wavelength of interest, and some layers may have a thickness bigger than that wavelength. Additionally, in some embodiments some of the layers may have a rough surface, rather than smooth, or may have a contoured surface, for example a zig-zag surface.

The methods and systems described in the present disclosure may be implemented in hardware, software, firmware or any combination thereof. Features described as blocks, modules or components may be implemented together (e.g., in a logic device such as an integrated logic device) or separately (e.g., as separate connected logic devices). The software portion of the methods of the present disclosure may comprise a computer-readable medium which comprises instructions that, when executed, perform, at least in part, the described methods. The computer-readable medium may comprise, for example, a random access memory (RAM) and/or a read-only memory (ROM). The instructions may be executed by a processor (e.g., a digital signal processor (DSP), an application specific integrated circuit (ASIC), a field programmable logic array (FPGA), a graphic processing unit (GPU) or a general purpose GPU).

A number of embodiments of the disclosure have been described. Nevertheless, it will be understood that various modifications may be made without departing from the spirit and scope of the present disclosure. Accordingly, other embodiments are within the scope of the following claims.

The examples set forth above are provided to those of ordinary skill in the art as a complete disclosure and description of how to make and use the embodiments of the disclosure, and are not intended to limit the scope of what the inventor/inventors regard as their disclosure.

Modifications of the above-described modes for carrying out the methods and systems herein disclosed that are obvious to persons of skill in the art are intended to be within the scope of the following claims. All patents and publications mentioned in the specification are indicative of the levels of skill of those skilled in the art to which the disclosure pertains. All references cited in this disclosure are incorporated by reference to the same extent as if each reference had been incorporated by reference in its entirety individually.

It is to be understood that the disclosure is not limited to particular methods or systems, which can, of course, vary. It is also to be understood that the terminology used herein is for the purpose of describing particular embodiments only, and is not intended to be limiting. As used in this specification and the appended claims, the singular forms "a," "an," and "the" include plural referents unless the content clearly dictates otherwise. The term "plurality" includes two or more referents unless the content clearly dictates otherwise. Unless defined otherwise, all technical and scientific terms used herein have the same meaning as commonly understood by one of ordinary skill in the art to which the disclosure pertains.

What is claimed is:

1. A sound proof helmet comprising:
a plurality of homogeneous layers arranged in a concentric hemispherical sequence, each homogeneous layer of the plurality of homogeneous layers having a thickness smaller than a wavelength in a desired acoustic frequency range, the plurality of homogeneous layers arranged in a sequence configured to optimize acoustic proofing, the plurality of homogeneous layers comprising
at least one first homogeneous layer of a first material with a low bulk modulus; and
at least one second homogeneous layer of a second material with a high bulk modulus.

2. The sound proof helmet of claim 1, wherein the at least one first material has a low density, and wherein the at least one second material has a high density.

3. The sound proof helmet of claim 1, wherein the at least one first material is an air cushion and/or a small airbag and wherein the at least one second material has a high density.

4. The sound proof helmet of claim 1, wherein the at least one first material and the at least one second material have a desired compressional wave velocity.

5. The sound proof helmet of claim 1, wherein the concentric hemispherical sequence is arranged so that layers of the at least one first material are alternated with layers of the at least one second material.

6. The method of claim 1, wherein the plurality of homogeneous layers is configured in a sequence according to computational modeling.

7. The sound proof helmet of claim 1, wherein the plurality of homogeneous layers comprises one or more layers with thickness different to other layers.

8. The sound proof helmet of claim 1, wherein the plurality of homogeneous layers comprises one or more layers with an irregular surface.

9. The sound proof helmet of claim 1, wherein the plurality of homogeneous layers comprises one or more layers with a contoured surface.

10. The sound proof helmet of claim 1, wherein the plurality of homogeneous layers comprises one or more layers with a zig-zag surface.

11. The sound proof helmet of claim 1, further comprising at least one homogeneous layer with a thickness bigger than the wavelength in the desired acoustic frequency range.

12. A method to fabricate the sound proof helmet of claim 1, the method comprising:
optimizing, by a computer, the sequence of the plurality of homogeneous layers.

13. The method of claim 12, wherein the optimizing is carried out by T-matrix methods, differential evolution and/or simulated annealing.

* * * * *